(12) United States Patent
Fetting et al.

(10) Patent No.: US 9,188,172 B2
(45) Date of Patent: Nov. 17, 2015

(54) COMPACT OVERRUNNING COUPLING AND CONTROL ASSEMBLY HAVING REDUCED PART COUNT AND MANUFACTURING COMPLEXITY

(71) Applicant: Means Industries, Inc., Saginaw, MI (US)

(72) Inventors: Robert D. Fetting, Caro, MI (US); Brice A. Pawley, Midland, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 0 days.

(21) Appl. No.: 14/150,090

(22) Filed: Jan. 8, 2014

(65) Prior Publication Data

US 2014/0190785 A1 Jul. 10, 2014

Related U.S. Application Data

(60) Provisional application No. 61/750,837, filed on Jan. 10, 2013.

(51) Int. Cl.
*F16D 41/00* (2006.01)
(52) U.S. Cl.
CPC ..................................... *F16D 41/00* (2013.01)
(58) Field of Classification Search
CPC ...................................................... F16D 41/00
USPC ....... 192/41 R, 46, 69, 35, 47, 43.1, 43.2, 38, 192/43, 44
See application file for complete search history.

(56) References Cited

U.S. PATENT DOCUMENTS

| 2,947,537 | A | 8/1960 | Littell et al. |
| 2,959,062 | A | 11/1960 | Looker |
| 4,050,560 | A | 9/1977 | Torstenfelt |
| 4,651,847 | A | 3/1987 | Hermanns |
| 5,927,455 | A | 7/1999 | Baker et al. |
| 6,193,038 | B1 | 2/2001 | Scott et al. |
| 6,244,965 | B1 | 6/2001 | Klecker et al. |
| 6,290,044 | B1 | 9/2001 | Burgman et al. |
| 6,568,517 | B2 * | 5/2003 | Le-Calve et al. ............... 192/46 |
| 6,905,009 | B2 | 6/2005 | Reed et al. |
| 7,198,587 | B2 | 4/2007 | Samie et al. |
| 7,258,214 | B2 | 8/2007 | Pawley et al. |
| 7,275,628 | B2 | 10/2007 | Pawley et al. |
| 7,344,010 | B2 | 3/2008 | Fetting, Jr. et al. |

(Continued)

OTHER PUBLICATIONS

International Search Report and Written Opinion; International application No. PCT/US2014/010991; date of mailing May 9, 2014.

(Continued)

*Primary Examiner* — David J Hlavka
(74) *Attorney, Agent, or Firm* — Brooks Kushman P.C.

(57) ABSTRACT

A compact overrunning coupling and control assembly having reduced part count and manufacturing complexity is provided. An actuator arm moves a control element from a first position which corresponds to a first mode of the assembly to a second position which corresponds to a second mode of the assembly. An actuator piston is disposed within the bore of a housing and has an outer surface in sliding contact with the inner surface of the housing and a groove formed in the outer surface of the piston to receive and retain a free end portion of the actuator arm therein. A control pressure signal within the housing causes the piston to slide within the bore against a biasing force to move the actuator arm.

20 Claims, 4 Drawing Sheets

(56) References Cited

U.S. PATENT DOCUMENTS

| | | |
|---|---|---|
| 7,464,801 B2 | 12/2008 | Wittkopp |
| 7,484,605 B2 | 2/2009 | Pawley et al. |
| 7,491,151 B2 | 2/2009 | Maguire et al. |
| 7,743,678 B2 | 6/2010 | Wittkopp et al. |
| 7,992,695 B2 | 8/2011 | Wittkopp et al. |
| 8,051,959 B2 | 11/2011 | Eisengruber |
| 8,056,690 B2 * | 11/2011 | Samie et al. ............. 192/43.1 |
| 8,061,496 B2 | 11/2011 | Samie et al. |
| 8,079,453 B2 | 12/2011 | Kimes |
| 8,087,502 B2 * | 1/2012 | Samie et al. ............. 192/47 |
| 8,272,488 B2 | 9/2012 | Eisengruber et al. |
| 8,286,772 B2 | 10/2012 | Eisengruber |
| 8,540,065 B2 * | 9/2013 | Samie et al. ............. 192/43.1 |
| 8,794,411 B2 * | 8/2014 | Lee et al. ............. 192/43 |
| 2004/0238306 A1 | 12/2004 | Reed et al. |
| 2006/0185957 A1 | 8/2006 | Kimes et al. |
| 2007/0034470 A1 | 2/2007 | Fetting, Jr. et al. |
| 2007/0278061 A1 | 12/2007 | Wittkopp et al. |
| 2008/0110715 A1 | 5/2008 | Pawley |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2010/0200358 A1 * | 8/2010 | Eisengruber et al. ......... 192/41 S |
| 2010/0230226 A1 | 9/2010 | Prout |
| 2010/0252384 A1 | 10/2010 | Eisengruber |
| 2011/0183806 A1 | 7/2011 | Wittkopp et al. |
| 2011/0192697 A1 | 8/2011 | Prout et al. |
| 2011/0273026 A1 | 11/2011 | Baarman |
| 2012/0145506 A1 | 6/2012 | Samie et al. |
| 2012/0152683 A1 | 6/2012 | Kimes |
| 2012/0152687 A1 | 6/2012 | Kimes et al. |

OTHER PUBLICATIONS

International Preliminary Report on Patentability; International application No. PCT/US2014/010991; date of issuance of report Jul. 14, 2015.

* cited by examiner

COMPACT OVERRUNNING COUPLING AND CONTROL ASSEMBLY HAVING REDUCED PART COUNT AND MANUFACTURING COMPLEXITY

CROSS REFERENCE TO RELATED APPLICATIONS

This application claims the benefit of U.S. provisional patent application No. 61/750,837 filed Jan. 10, 2013.

TECHNICAL FIELD

This invention relates, in general, to the field of overrunning coupling and control assemblies and, more particularly, to compact overrunning coupling and control assemblies having reduced part count and manufacturing complexity.

OVERVIEW

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:
  roller type which includes spring-loaded rollers between inner and outer races of the one-way clutch. (Roller type is also used without springs on some applications); and
  sprag type which includes asymmetrically shaped wedges located between inner and outer races of the one-way clutch.

One way clutches typically over run during engine braking rather than enable engine braking. It is for this reason there is a friction pack at the same transmission node. Selectable dynamic clutches can be used to prevent the over running condition and enable engine braking.

Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selection mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable or selectable OWC's which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvements in clutches subjected to difficult service conditions such as extreme temperatures. This is particularly true in the automotive industry where developers and manufacturers of clutches for automotive applications must meet a number of competing performance specifications for such articles.

Another problem associated with prior art coupling and control assemblies is that it is undesireable to have a relatively large distance between the control element and the activator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include 2012/0145506; 2011/0192697; 2011/0183806; 2010/0252384; 2010/0230226; 2010/0200358; 2009/0194381; 2008/0223681; 2008/0169166; 2008/0185253; and the following U.S. Pat. Nos. 8,079,453; 7,992,695, 8,051,959, 7,743,678; and 7,491,151.

Figure 1A:
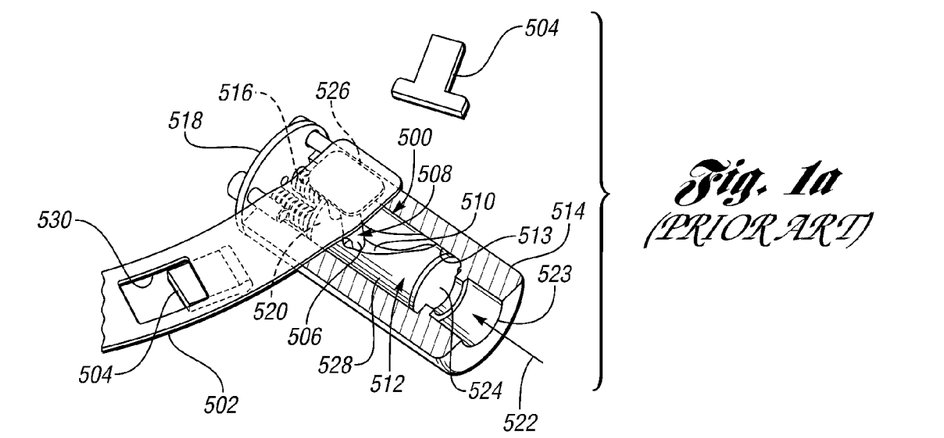
FIGS. 1a-1c are schematic views, partially broken away and in cross section, of a control element with associated struts and its control apparatus of the prior art in the form of a perpendicular actuating shift valve or piston (latching mechanism) in different control positions in the different views.
Figure 1B:
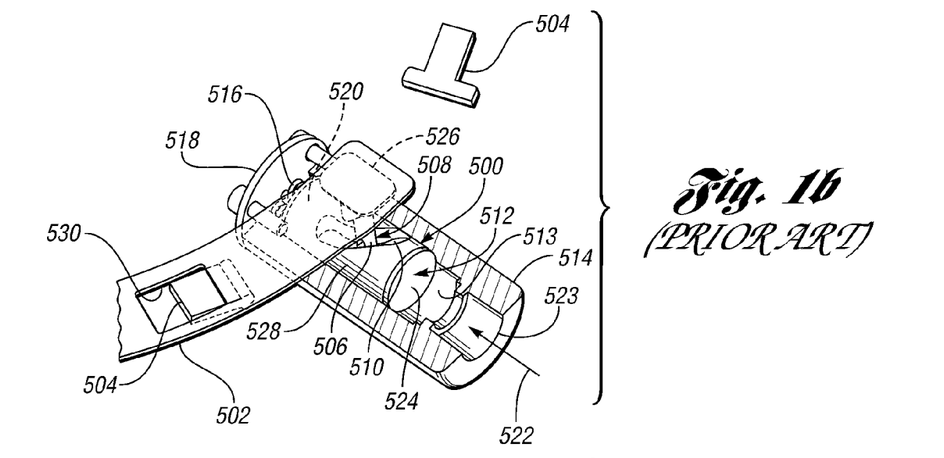
Figure 1C:
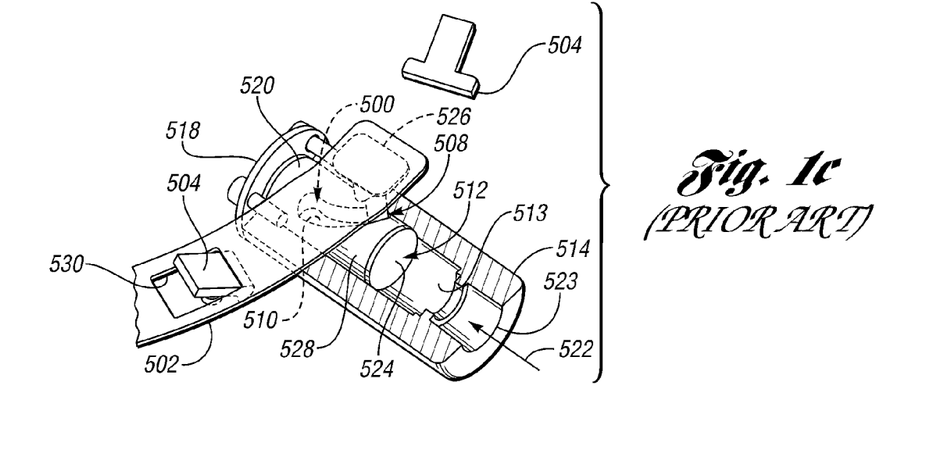

U.S. Pat. No. 8,272,488 discloses in its FIGS. 9c-9 c (labeled as FIGS. 1a-1c, respectively, in this Application). a "perpendicular actuating shift valve" latching mechanism, generally indicated at 500. A control plate or element 502 of a one-way clutch is provided which shifts or slides along a shift direction between pocket and recess plates (not shown) of the clutch to controllably cover and uncover struts 504 which are spring-biased within the pocket plate. A free end portion 506 of an actuating arm or pin, generally indicated at 508, may move within a curved pin recess or groove 510 formed in an outer surface 528 of a valve or piston, generally indicated at 512, in a direction substantially perpendicular to a shift direction of the control plate 502 during sliding movement of the piston or valve 512 within a bore 513 formed in a housing 514. The side walls or surfaces of the grooves 510 lock the pin 508 therebetween as shown in FIG. 1a to prevent movement of the pin 508 in a direction parallel to the shift direction of the control plate 502. The groove 510 may be curved and the free end portion 506 of the actuating arm 508 may simultaneously move within the groove 510 in both a direction substantially parallel to the shift axis and in a direction substantially perpendicular to the shift axis during movement of the piston 512 within the housing 514. Compression springs 516, also disposed within the bore 513, are biased between a cover 518 of the housing 514 and one end 520 of the valve 512. The plate 502 of the one-way clutch is disclosed in its overrun position in FIG. 1a and moves to it slocked position in FIG. 1c. Application of a control pressure 522 through a control portion 523 of the housing 514 at the opposite end 524 of the valve or piston 512 causes the valve 512 to move against the biasing action of the compression springs 516 so that the actuating pin 508, which is secured to the control plate 502 at a pin attachment portion 526, moves within the curved pin recess or groove 510 formed in the outer surface 528 of the valve 512 as shown in FIGS. 1b and 1c. As shown in FIG. 1c, one of the struts 504 now extends through an aperture 530 formed in the control plate 502 to lock the one-way clutch.

Other U.S. patent publications which disclose controllable or selectable one-way clutches include U.S. Pat. Nos. 6,193, 038; 7,198,587; 7,275,628; and 7,464,801, and U.S. Publication Application Nos. 2007/0278061; 2008/0110715; 2009/0159391; and 2009/0211863.

Other U.S. patent documents related to the present application include: U.S. Pat. Nos. 2,947,537; 2,959,062; 4,050, 560; 4,651,847; 6,905,009; 8,061,496; 8,286,772; 2004/0238306; 2006/0185957; 2007/0034470; 2011/0273026; 2012/0152683; and 2012/0152687.

For purposes of this application, the term coupling should be interpreted to include clutches or brakes wherein one of the plates is drivably connected to a torque delivery element of a transmission and the other plate is drivably connected to another torque delivery element or is anchored and held stationary with respect to a transmission housing. The terms coupling, clutch and brake may be used interchangeably.

SUMMARY OF EXAMPLE EMBODIMENTS

An object of at least one embodiment of the present invention is to provide an overrunning coupling and control assembly without the need for additional materials or additional post processing stages thereby providing a relatively light and cost-efficient assembly with reduced part count and manufacturing complexity.

Another object of at least one embodiment of the present invention is to provide an overrunning coupling and control assembly which can function properly during extended use when subjected to difficult service conditions such as extreme temperatures.

Yet another object of at least one embodiment of the present invention is to provide an overrunning coupling and control assembly which is compact by reducing the distance between a control element or selector plate of the assembly and the actuator which moves the control element.

In carrying out the above objects and other objects of at least one embodiment of the present invention, an overrunning coupling and control assembly is provided. The assembly includes first and second coupling members having first and second coupling faces, respectively, in close-spaced opposition with one another. At least one of the members is mounted for rotation about an axis. The assembly also includes a control element mounted for controlled shifting movement between the coupling faces and a housing having an outer surface, an inner surface which defines a bore within the housing and a control port which extends between and fluidly communicates the inner and outer surfaces of the housing to transmit a control pressure signal into the housing. The first coupling member and the housing are formed as a unitary component having a common wall separating and shared by the first coupling member and the housing. The wall has an elongated slot which extends between and fluidly communicates the inner surface of the housing and an inner surface of the first coupling member. The assembly further includes an actuator arm coupled to the control element to move the control element along a shift direction substantially parallel to a direction in which the slot is elongated. The actuator arm moves the control element from a first position which corresponds to a first mode of the assembly to a second position which corresponds to a second mode of the assembly and back to the first position. The assembly still further includes an actuator piston disposed within the bore of the housing and having an outer surface in sliding contact with the inner surface of the housing and a groove formed in the outer surface of the piston to receive and retain a free end portion of the actuator arm therein so that the actuator arm moves when the piston moves. Finally, the assembly includes a biasing member disposed within the bore of the housing to exert a biasing force on the piston. The control pressure signal within the housing causes the piston to slide within the bore against the biasing force of the biasing member to move the actuator arm and, in the absence of the control pressure signal, the biasing member moves the piston and, consequently, the actuator arm.

The assembly may further include a latching mechanism to prevent the actuator arm from moving in a first direction substantially parallel to the shift direction within the slot in a locked condition of the mechanism in the first position of the control element. The control pressure signal within the housing changes the condition of the latching mechanism from locked to unlocked to unlock the actuator arm and cause the unlocked actuator arm to move along the first direction within the slot and the control element to move along the shift direction to the second position. The control pressure signal causes the piston to slide within the bore against the biasing force of the biasing member. In the absence of a control pressure signal, the biasing member moves the piston and thereby the unlocked actuator arm in a second direction opposite the first direction within the slot and the control element along the shift direction from the second position back to the first position to change the condition of the latching mechanism from unlocked to locked to lock the actuator arm.

The first position may be an overrun position, the first mode may be an overrun mode, the second position may be a locked position, and the second mode may be a locked mode.

The latching mechanism may include portions of the groove formed in the outer surface of the piston wherein the free end portion of the actuating arm is movable within the groove in response to the control pressure signal within the housing.

The groove may be angular wherein the free end portion of the actuating arm moves within the groove in both a direction substantially parallel to the shift direction and in a direction substantially perpendicular to the shift direction during movement of the piston within the housing.

One of the coupling members may include a notch plate and the other of the coupling members may include a pocket plate integrally formed with the common wall. The assembly may further include a locking member disposed between the coupling faces of the coupling members and movable between first and second positions. The control element may be operable to control position of the locking member. The locking member may be a reverse strut.

The control element may be a control or selector plate rotatable about the axis.

The control element may have at least one opening which extends completely therethrough to allow the locking member to extend therethrough to the first position of the locking member in a control position of the control element.

Further in carrying out the above objects and other objects of at least one embodiment of the present invention, an overrunning clutch and control assembly is provided. The assembly includes first and second clutch members including first and second clutch faces, respectively, in close-spaced opposition with one another. At least one of the members is mounted for rotation about an axis. A control element is mounted for controlled shifting movement between the clutch faces. A housing has an outer surface, an inner surface which defines a bore within the housing and a control port which extends between and fluidly communicates the inner and outer surfaces of the housing to transmit a control pressure signal into the housing. The first coupling member and the housing are formed as a unitary component having a common wall separating and shared by the first clutch member and the housing. The wall has an elongated slot which extends between and fluidly communicates the inner surface of the housing and an inner surface of the first clutch member. An actuator arm is coupled to the control element to move the control element along a shift direction substantially parallel to a direction in which the slot is elongated. The actuator arm moves the control element from a first position which corresponds to a first mode of the assembly to a second position which corresponds to a second mode of the assembly and back to the first position. An actuator piston is disposed within the bore of the housing and has an outer surface in sliding contact with the inner surface of the housing and a groove formed in the outer surface of the piston to receive and retain a free end portion of the actuator arm therein so that the actuator arm moves when the piston moves. A biasing member is disposed within the bore of the housing to exert a biasing force on the piston. The control pressure signal within the housing causes the piston to slide within the bore against the biasing force of the biasing member to move the actuator arm. In the absence of the control pressure signal, the biasing member moves the piston and, consequently, the actuator arm.

The assembly may further include a latching mechanism to prevent the actuator arm from moving in a first direction substantially parallel to the shift direction within the slot in a locked condition of the mechanism in the first position of the control element. The control pressure signal within the housing changes the condition of the latching mechanism from locked to unlocked to unlock the actuator arm and cause the unlocked actuator arm to move along the first direction within the slot and the control element to move along the shift direction to the second position. The control pressure signal causes the piston to slide within the bore against the biasing force of the biasing member. In the absence of a control pressure signal, the biasing member moves the piston and thereby the unlocked actuator arm in a second direction opposite the first direction within the slot and the control element along the shift direction from the second position back to the first position to change the condition of the latching mechanism from unlocked to locked to lock the actuator arm.

The first position may be an overrun position, the first mode may be an overrun mode, the second position may be a locked position, and the second mode may be a locked mode.

The latching mechanism may include portions of the groove formed in the outer surface of the piston wherein the free end portion of the actuating arm may be movable within the groove in response to the control pressure signal within the housing.

The groove may be angular wherein the free end portion of the actuating arm may move within the groove in both a direction substantially parallel to the shift direction and in a direction substantially perpendicular to the shift direction during movement of the piston within the housing.

One of the clutch members may include a notch plate and the other of the clutch members may include a pocket plate integrally formed with the common wall.

The assembly may further include a locking member disposed between the clutch faces of the clutch members and may be movable between first and second positions. The control element may be operable to control position of the locking member.

The locking member may be a reverse strut.

The control element may be a control or selector plate rotatable about the axis.

The control element may have at least one opening which extends completely therethrough to allow the locking member to extend therethrough to the first position of the locking member in a control position of the control element.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
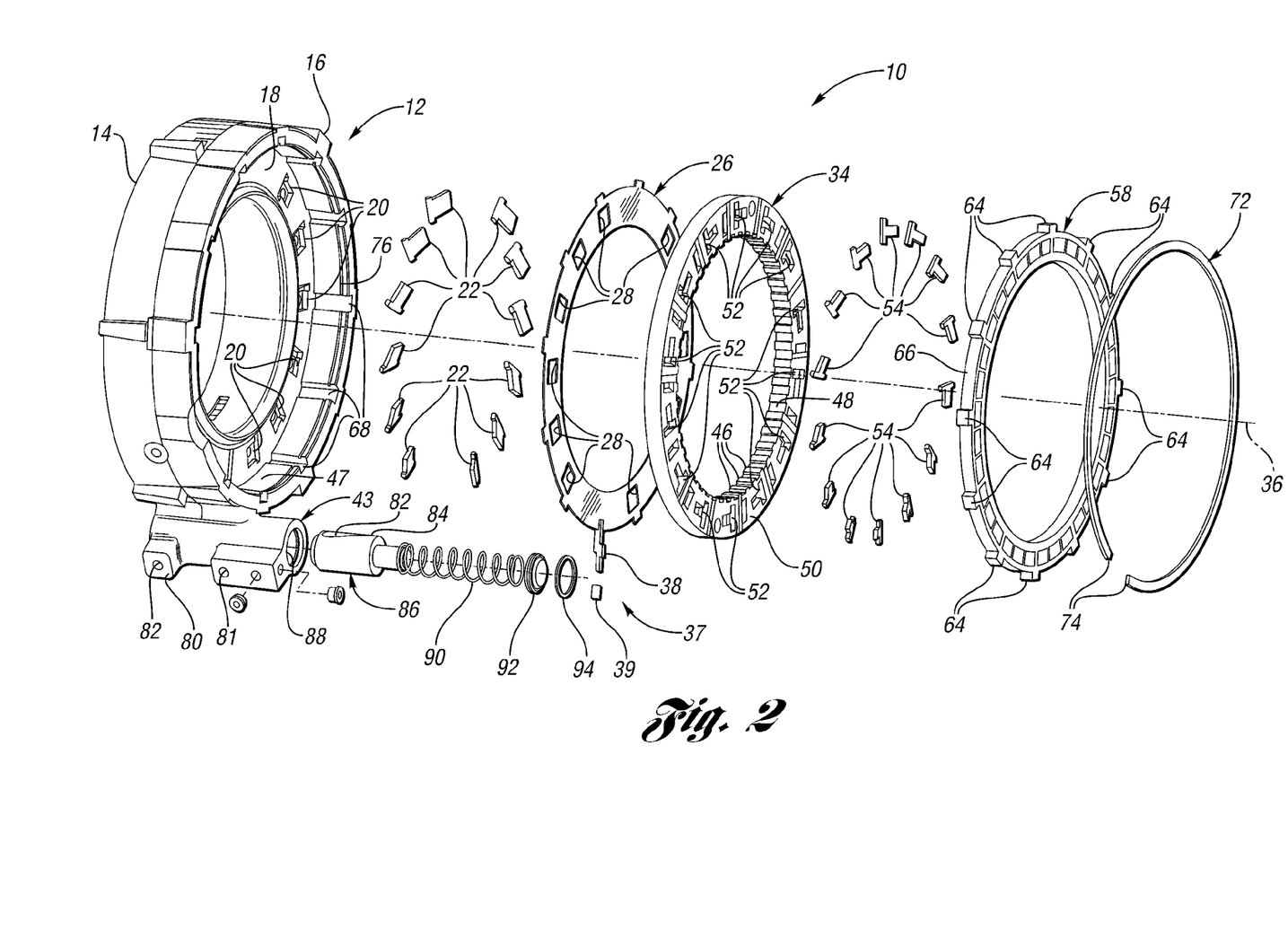
FIG. 2 is an exploded perspective view of an overrunning coupling or clutch and control assembly constructed in accordance with at least one embodiment of the present invention.

Referring again to the drawing figures, FIG. 2 is an exploded perspective view of an overrunning clutch or coupling and control assembly, generally indicated at 10, and constructed in accordance with at least one embodiment of the present invention. As described in U.S. patent document 2010/0230226, assigned to the assignee of the present application, the assembly 10 includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs (not shown) disposed in the pockets 20 under their respective struts 22. Preferably, twelve reverse struts 22 are provided. However, it is to be understood that a greater or lesser number of reverse struts may be provided.

The assembly 10 also includes a control element or selector slide plate, generally indicated at 26, having a plurality of spaced apertures 28 extending completely therethrough to allow the reverse struts 22 to pivot in their pockets 20 and extend through the apertures 28 to engage spaced locking formations or ramped reverse notches (not shown) formed in a radially extending surface or coupling face of a forward or inner pocket plate or coupling member, generally indicated at 34, when the plate 26 is properly angularly positioned about a common central rotational axis 36 by an actuator arm, generally indicated at 37. The arm 37 includes a shift fork part 38 coupled to the plate 26 and a slide part 39 coupled to the part 28.

Figure 3:
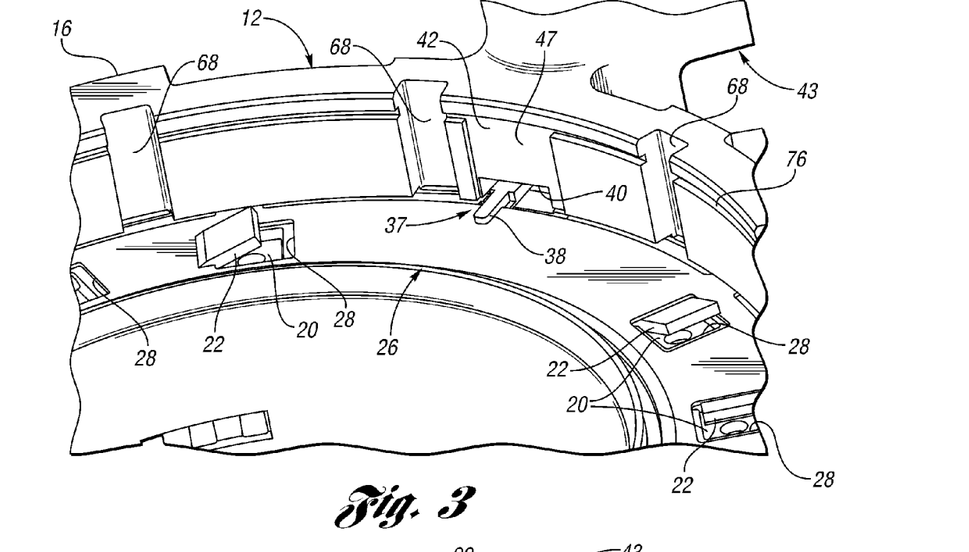
FIG. 3 is a perspective schematic view, partially broken away, of a control element (selector plate) coupled to an actuator arm which has rotated or shifted the control element to expose reverse struts
Figure 4:
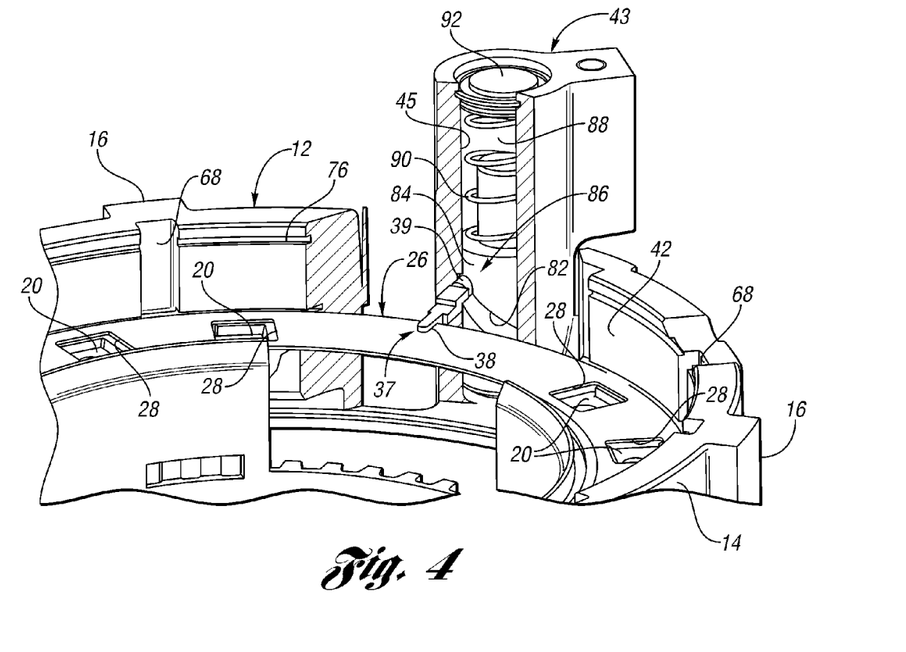
FIG. 4 is a perspective schematic view, similar to the view of FIG. 3, with a portion of the common wall separating and shared by the first coupling member and the housing removed to show an actuator piston or valve and the actuator arm in the housing and with the reverse struts removed.

As shown in FIG. 3, the arm 37 extends through a notch or elongated slot 40 formed through a wall or wall portion 42 of an outer circumferential end wall of the plate 12. The wall 42 is a common wall separating and shared by the first coupling member 12 and a housing, generally indicated at 43. The elongated slot 40 extends between and thereby communicates an inner surface 45 of the housing 43 and an inner surface 47 of the wall 42 of the first coupling member 12. The fork part 38 of the arm 32 is secured or coupled to the control plate 26. The slide part 39 of the arm 37 moves in the slot 40 between different use positions to cause the plate 26 to slide or shift between its control positions to alternately cover or uncover the struts 22 (i.e., to engage or disengage the reverse struts 22, respectively).

The plate 34 comprises a splined ring having internal splines 46 formed at its inner axially extending surface 48. A radially extending surface 50 or coupling face spaced from the other coupling face (not shown) of the plate 34 has a plurality of spaced pockets 52 formed therein to receive a plurality of forward struts 54 therein which are pivotally biased by corresponding coil springs (not shown). Preferably, fourteen forward struts 54 are provided. However, it is to be understood that a greater or lesser number of forward struts 54 may be provided.

The assembly 10 may also include a second outer coupling member or notch plate, generally indicated at 58, which has a plurality of locking formations, cams or notches (not shown) formed in a radially extending surface or coupling face (not shown) thereof by which the forward struts 54 lock the forward plate 34 to the notch plate 58 in one direction about the axis 36 but allow free-wheeling in the opposite direction about the axis 36. The notch plate 58 includes external splines 64 which are formed on an outer axial surface 66 of the plate 58 and which are received and retained within axially extending recesses 68 formed within the inner axially extending surface 47 of the outer circumferential end wall of the plate 12.

The assembly 10 may further include a snap ring, generally indicated at 72, having end portions 74 and which fits within an annular groove 76 formed within the inner surface 47 of the end wall of the plate 12 to hold the plates 12, 26, 34 and 58 together and limit axial movement of the plates relative to one another.

FIG. 3 is a view of the assembly 10 with the shift fork 38 of the arm 37 in one control position of its control positions to disengage the reverse struts 22. The shift fork 38 is rotated about 7° in a forward overrun direction about the axis 36 to rotate the selector plate 26 to, in turn, allow the reverse struts 22 to move from their disengaged position in their pockets 20 to their engaged position with the notches (not shown) of the plate 34

Referring to FIGS. 2-6, the housing 43 has an outer surface 80 and the inner surface 45 which defines a bore 88 within the housing 43. A control port 82 extends between and fluidly communicates the inner and outer surfaces 45 and 80, respectively, of the housing 43 to transmit a control pressure signal into the housing 43. A second control part 81 is also provided for oil flow. The first coupling member 12 and the housing 43 are formed as a unitary component having the common wall 42 separating and shared by the first coupling member 12 and the housing 43. The member 12 and the housing 43 is typically formed as a one-piece aluminum casting thereby providing an integral unitary structure.

Figure 5:
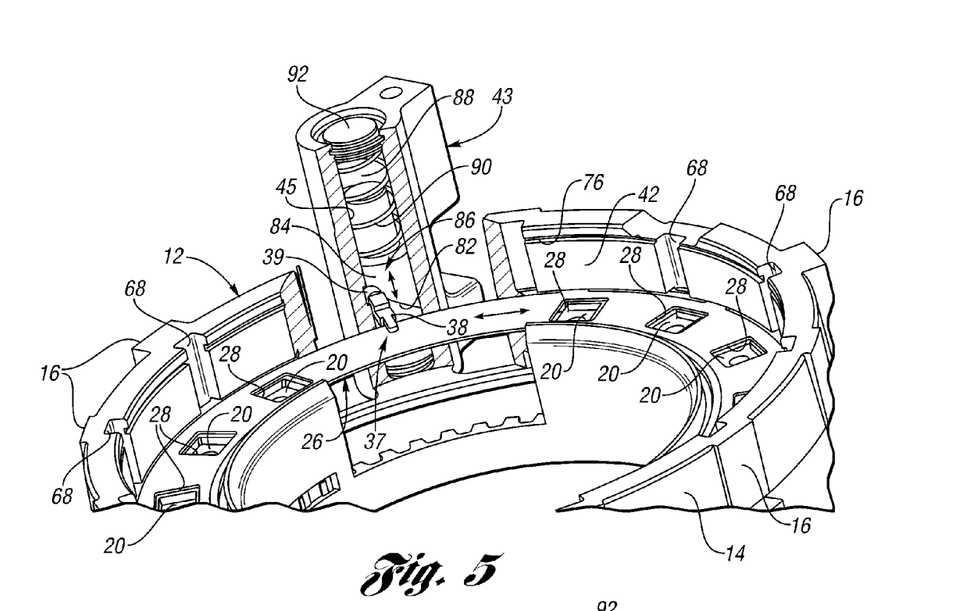
FIG. 5 is a perspective schematic view, similar to the view of FIG. 4, with the portion of the common wall removed to show the angular slot in the actuator piston wherein axial movement of the piston creates radial movement of the selector plate.

The free end portion or slide part 39 of the actuating arm 37, moves within a curved or angular pin recess or groove 82 formed in an outer surface 84 of a valve or piston, generally indicated at 86, in a direction substantially perpendicular to a shift direction of the control plate 26 during sliding movement of the piston 86 within the bore 88 formed in a housing 43. The side walls or surfaces of the groove 82 lock the slide part 39 therebetween to prevent movement of the slide part 39 in a direction parallel to the shift direction of the control plate 26. The groove 82 may be curved and the slide part 39 of the actuating arm 37 may simultaneously move within the groove 82 in both a direction substantially parallel to the shift axis and in a direction substantially perpendicular to the shift axis during movement of the piston 86 within the housing 43. A compression spring 90, also disposed within the bore 88, is biased between a cover 92 of the housing 43 and a shoulder of the valve 86. The cover 92 is held in the housing 43 by a locking or snap ring 94 (FIG. 6).

Application of a control pressure through the control port 82 of the housing 43 at the end of the valve or piston 82 opposite the spring 90 causes the valve 86 to move against the biasing action of the compression spring 90 so that the slide part 39 of the actuating arm 37, which is secured to the control plate 26 at the fork 38, moves within the curved pin recess or groove 82 formed in the outer surface 84 of the valve 86.

Figure 6:
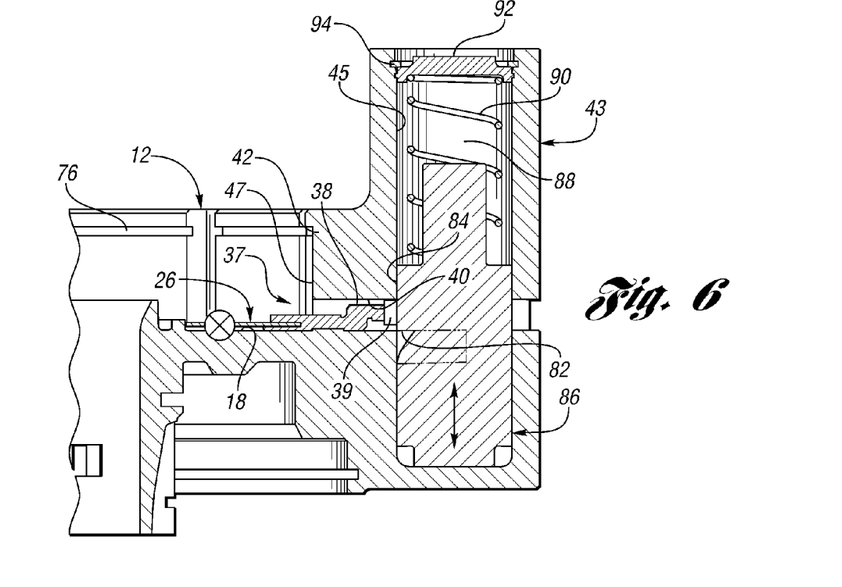
FIG. 6 is a view, partially broken away and in cross section, showing the integrally formed common wall and how the selector plate is actuated by movement of the piston within the housing.

When the actuator piston 86 is in its "home" position as shown in FIG. 6, the reverse struts 22 are covered by the selector plate 26. Oil in the form of a control pressure signal is applied and the piston 86 is moved "up" in the bore 88. This axial movement of the actuator piston 86 is translated to radial movement of the selector plate 26 via the arm 37 and the angular slot 82 in the actuator piston 86, hence uncovering the reverse struts 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overrunning coupling and control assembly comprising:
   a first coupling member including a first coupling face and a second coupling member including a second coupling face, the coupling faces being in close-spaced opposition with one another, at least one of the members being mounted for rotation about an axis;

a control element mounted for controlled rotational movement between the coupling faces about the axis; and an actuator in close-spaced opposition with the control element, the actuator including:

an actuator housing having an outer surface, an inner surface which defines a bore within the housing and a control port which extends between and fluidly communicates the inner and outer surfaces of the housing to transmit a control pressure signal into the housing, the housing maintaining the control pressure signal within the housing;

an actuator arm coupled to the control element to rotate the control element about the axis, the actuator arm moving the control element from a first position which corresponds to a first mode of the coupling and control assembly to a second position which corresponds to a second mode of the coupling and control assembly and back to the first position;

an actuator piston disposed within the bore of the housing, the piston having an outer surface in sliding contact with the inner surface of the housing;

a groove to receive and retain a free end portion of the actuator arm therein so that the actuator arm radially moves the control element about the axis when the piston axially moves in a direction substantially parallel to the axis; and a biasing member disposed within the bore of the housing to exert a biasing force on the piston, the control pressure signal maintained within the housing causing the piston to slide within the bore against the biasing force of the biasing member to move the actuator arm and, in the absence of the control pressure signal, the biasing member moves the piston and, consequently, the actuator arm.

2. The assembly as claimed in claim 1, further comprising a latching mechanism to prevent the actuator arm from moving in a first direction within the slot in a locked condition of the mechanism in the first position of the control element, the control pressure signal within the housing changing the condition of the latching mechanism from locked to unlocked to unlock the actuator arm and causing the unlocked actuator arm to move along the first direction within the slot and the control element to move to the second position, the control pressure signal causing the piston to slide within the bore against the biasing force of the biasing member and wherein, in the absence of the control pressure signal, the biasing member moves the piston and thereby the unlocked actuator arm in a second direction opposite the first direction within the slot and the control element from the second position back to the first position to change the condition of the latching mechanism from unlocked to locked to lock the actuator arm.

3. The assembly as claimed in claim 1, wherein the first position is an overrun position, the first mode is an overrun mode, the second position is a locked position, and the second mode is a locked mode.

4. The assembly as claimed in claim 2, wherein the latching mechanism includes portions of the groove and wherein the free end portion of the actuating arm is movable within the groove in response to the control pressure signal within the housing.

5. The assembly as claimed in claim 1, wherein the groove is angular and wherein the free end portion of the actuating arm moves within the groove during movement of the piston within the housing.

6. The assembly as claimed in claim 1, wherein one of the coupling members includes a notch plate and the other of the coupling members includes a pocket plate.

7. The assembly as claimed in claim 1, further comprising a locking member disposed between the coupling faces of the coupling members, the locking member being movable between first and second positions, the control element being operable to control position of the locking member.

8. The assembly as claimed in claim 7, wherein the locking member is a reverse strut.

9. The assembly as claimed in claim 7, wherein the control element is a control or selector plate rotatable about the axis.

10. The assembly as claimed in claim 7, wherein the control element has at least one opening which extends completely therethrough to allow the locking member to extend therethrough to the first position of the locking member in a control position of the control element.

11. An overrunning clutch and control assembly comprising:

a first clutch member including a first clutch face and a second clutch member including a second clutch face, the clutch faces being in close-spaced opposition with one another, at least one of the members being mounted for rotation about an axis;

a control element mounted for controlled rotational movement between the clutch faces about the axis; and an actuator in close-spaced opposition with the control element, the actuator including:

a housing having an outer surface, an inner surface which defines a bore within the housing and a control port which extends between and fluidly communicates the inner and outer surfaces of the housing to transmit a control pressure signal into the housing, the housing maintaining the control pressure signal within the housing;

an actuator arm coupled to the control element to rotate the control element about the axis, the actuator arm moving the control element from a first position which corresponds to a first mode of the assembly to a second position which corresponds to a second mode of the assembly and back to the first position;

an actuator piston disposed within the bore of the housing and having an outer surface in sliding contact with the inner surface of the housing;

a groove to receive and retain a free end portion of the actuator arm therein so that the actuator arm radially moves the control element about the axis when the piston axially moves in a direction substantially parallel to the axis; and a biasing member disposed within the bore of the housing to exert a biasing force on the piston, the control pressure signal maintained within the housing causing the piston to slide within the bore against the biasing force of the biasing member to move the actuator arm and, in the absence of the control pressure signal, the biasing member moves the piston and, consequently, the actuator arm.

12. The assembly as claimed in claim 11, further comprising a latching mechanism to prevent the actuator arm from moving in a first direction within the slot in a locked condition of the mechanism in the first position of the control element, the control pressure signal within the housing changing the condition of the latching mechanism from locked to unlocked to unlock the actuator arm and causing the unlocked actuator arm to move along the first direction within the slot and the control element to move to the second position, the control pressure signal causing the piston to slide within the bore against the biasing force of the biasing member and wherein, in the absence of the control pressure signal, the biasing member moves the piston and thereby the unlocked actuator arm in a second direction opposite the first direction within the slot and the control element from the second position back to the first position to change the condition of the latching mechanism from unlocked to locked to lock the actuator arm.

13. The assembly as claimed in claim 11, wherein the first position is an overrun position, the first mode is an overrun mode, the second position is a locked position, and the second mode is a locked mode.

14. The assembly as claimed in claim 12, wherein the latching mechanism includes portions of the groove formed in an outer surface of the piston and wherein the free end portion of the actuating arm is movable within the groove in response to the control pressure signal within the housing.

15. The assembly as claimed in claim 11, wherein the groove is angular and wherein the free end portion of the actuating arm moves within the groove during movement of the piston within the housing.

16. The assembly as claimed in claim 11, wherein one of the clutch members includes a notch plate and the other of the clutch members includes a pocket plate.

17. The assembly as claimed in claim 11, further comprising a locking member disposed between the clutch faces of the clutch members and being movable between first and second positions, the control element being operable to control position of the locking member.

18. The assembly as claimed in claim 17, wherein the locking member is a reverse strut.

19. The assembly as claimed in claim 17, wherein the control element is a control or selector plate rotatable about the axis.

20. The assembly as claimed in claim 17, wherein the control element has at least one opening which extends completely therethrough to allow the locking member to extend therethrough to the first position of the locking member in a control position of the control element.

* * * * *